(12) United States Patent
Rho et al.

(10) Patent No.: US 8,134,652 B2
(45) Date of Patent: Mar. 13, 2012

(54) LIQUID CRYSTAL DISPLAY HAVING SENSOR AND SPACER ARRANGEMENT AND AND METHOD OF MANUFACTURING THE SAME

(75) Inventors: Soo-Guy Rho, Suwon-si (KR);
Seong-Jun Lee, Seoul (KR);
Chul-Hwan Park, Cheonan-si (KR);
Kee-Han Uh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 859 days.

(21) Appl. No.: 12/173,398

(22) Filed: Jul. 15, 2008

(65) Prior Publication Data

US 2009/0180043 A1    Jul. 16, 2009

(30) Foreign Application Priority Data

Jan. 16, 2008   (KR) .................. 10-2008-0005064

(51) Int. Cl.
*G02F 1/1339* (2006.01)
*G02F 1/1335* (2006.01)
*G06F 3/041* (2006.01)

(52) U.S. Cl. ........... 349/12; 349/155; 349/157; 345/173

(58) Field of Classification Search .............. 349/12, 349/155, 157; 345/104, 173, 174
See application file for complete search history.

(56) References Cited

U.S. PATENT DOCUMENTS

| | | | | |
|---|---|---|---|---|
| 6,501,529 B1 * | 12/2002 | Kurihara et al. | ............ | 349/160 |
| 7,274,424 B1 * | 9/2007 | Kurihara et al. | ............ | 349/155 |
| 2006/0109222 A1 * | 5/2006 | Lee et al. | ............ | 345/88 |
| 2007/0070047 A1 * | 3/2007 | Jeon et al. | ............ | 345/173 |
| 2007/0132936 A1 * | 6/2007 | Lee et al. | ............ | 349/156 |

\* cited by examiner

*Primary Examiner* — Michael Caley
(74) *Attorney, Agent, or Firm* — Cantor Colburn LLP (57) ABSTRACT

A liquid crystal display ("LCD") includes: a first substrate; a sensor pad disposed on the first substrate; a second substrate which faces the first substrate; a sensor spacer and a supporting spacer disposed on the second substrate; and a supporting dielectric portion disposed between the supporting spacer and the first substrate. The sensor spacer is spaced apart from the sensor pad, and includes a sensor electrode disposed on a portion of the sensor spacer which faces the sensor pad. The supporting spacer is spaced apart from the first substrate, and the supporting dielectric portion uniformly maintains a cell gap between the first substrate and the second substrate.

24 Claims, 10 Drawing Sheets

LIQUID CRYSTAL DISPLAY HAVING SENSOR AND SPACER ARRANGEMENT AND AND METHOD OF MANUFACTURING THE SAME

This application claims priority to Korean Patent Application No. 10-2008-0005064, filed on Jan. 16, 2008, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") and a method of manufacturing the LCD, and more particularly, to an LCD having substantially improved operating reliability and durability and a method of manufacturing the LCD.

2. Description of the Related Art

Touch screen display devices are a type of advanced input device which can replace existing input devices such as a keyboards or a mouse, for example. Touch screen display devices typically include a touch screen mounted on a liquid crystal panel, and perform operations in response to a touch input on the liquid crystal panel. Touch screen display devices are suitable for allowing various tasks to be easily performed in a graphic user interface ("GUI") environment such as in a MICROSOFT WINDOWS® operating system ("OS") environment, and thus can be widely used in fields of computer-based training and simulation applications, office automation applications, education applications and game applications, for example.

A typical touch screen includes a liquid crystal panel for displaying images, a touch panel attached to the liquid crystal panel, a controller, a device driving module and an application program.

The combination of a touch screen display device and a liquid crystal display ("LCD") has been widely used in various portable devices such as a personal digital assistant ("PDA") or a mobile phone, for example.

In general, when a user touches or slightly presses a certain portion on the touch screen display device with their finger or a pen, for example, electrically connected upper and lower conductive layers of the touch screen display device detect a position corresponding to the pressed portion on the touch screen display device.

Thus, it is desirable for the touch screen device to have a high operating reliability and durability when repeatedly exposed to external pressure, or when used for an extended period of time.

BRIEF SUMMARY OF THE INVENTION

An exemplary embodiment of the present invention provides a liquid crystal display ("LCD") having substantially improved operating reliability and durability.

An exemplary embodiment of the present invention also provides a method of manufacturing the LCD having substantially improved operating reliability and durability.

According to an exemplary embodiment of the present invention, an LCD includes: a first substrate; a sensor pad disposed on the first substrate; a second substrate which faces the first substrate; a sensor spacer disposed on the second substrate; a supporting spacer disposed on the second substrate; and a supporting dielectric portion disposed between the supporting spacer and the first substrate. The sensor spacer is spaced apart from the sensor pad, and comprises a sensor electrode disposed on a portion of the sensor spacer which faces the sensor pad. The supporting spacer is spaced apart from the first substrate, and the supporting dielectric portion uniformly maintains a cell gap between the first substrate and the second substrate.

According to an alternative exemplary embodiment of the present invention, a method of manufacturing an LCD includes: forming a black matrix on an insulating substrate; forming a sensor spacer on the black matrix; forming a supporting spacer on the black matrix; forming an electrode on the sensor spacer and the supporting spacer; and forming a supporting dielectric portion on the supporting spacer.

BRIEF DESCRIPTION OF THE DRAWINGS

The above and other aspects, features and advantages of the present invention will become more readily apparent by describing in further detail exemplary embodiments thereof with reference to the accompanying drawings, in which:

FIGS. 4A through 4E are partial cross-sectional views for explaining a manufacturing process of an upper display panel of the LCD according to the exemplary embodiment of the present invention shown in FIG. 1;

DETAILED DESCRIPTION OF THE INVENTION

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

A liquid crystal display ("LCD") according to an exemplary embodiment of the present invention will hereinafter be described in further detail with reference to FIGS. 1 through 2C.

Figure 1:
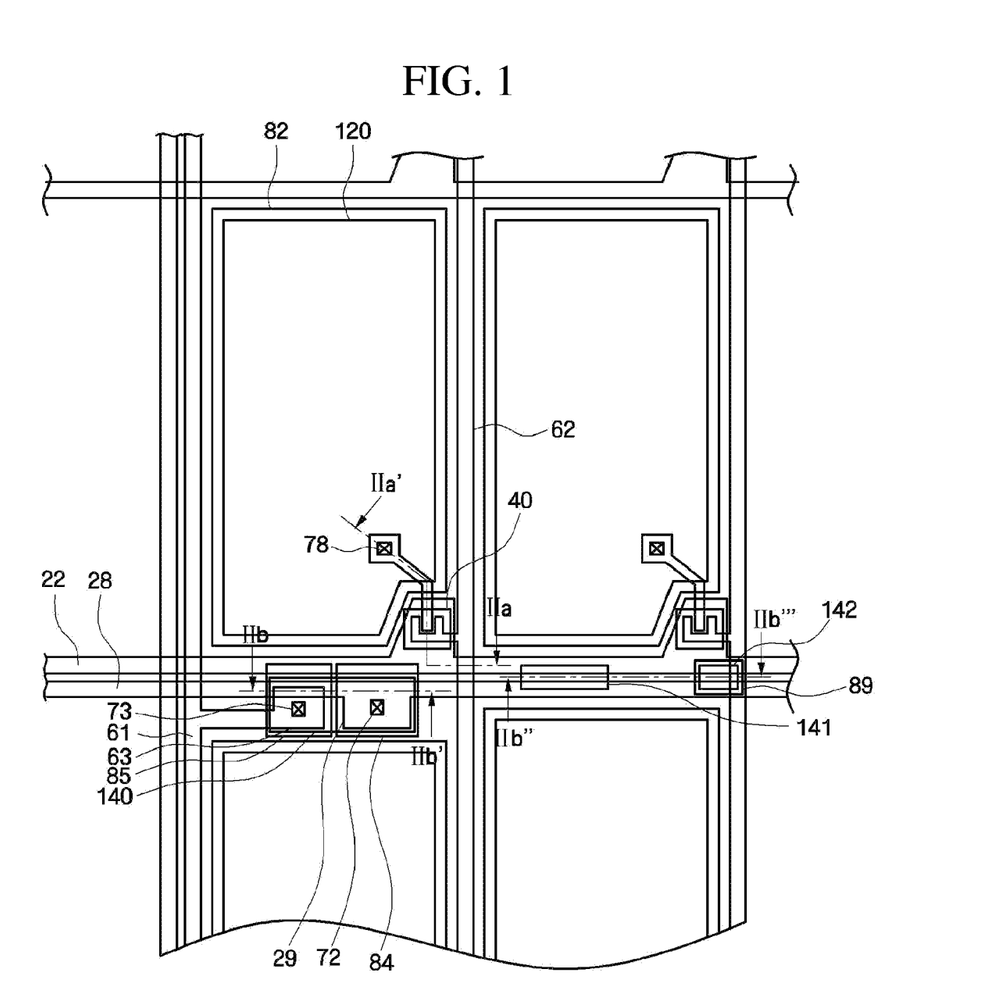
FIG. 1 is a layout view of a liquid crystal display ("LCD") according to an exemplary embodiment of the present invention.
Figure 2A:
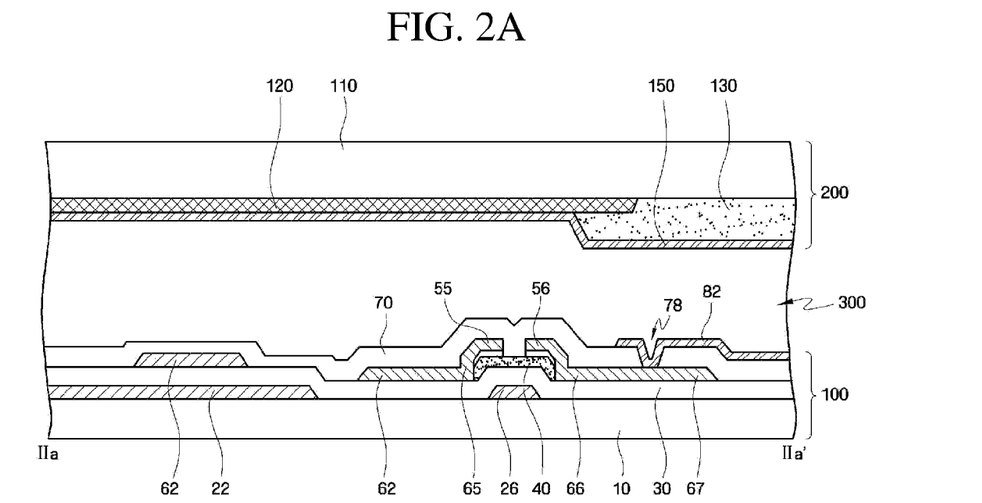
FIG. 2A is a partial cross-sectional view taken along line Ia-Ia' of FIG. 1.
Figure 2B:
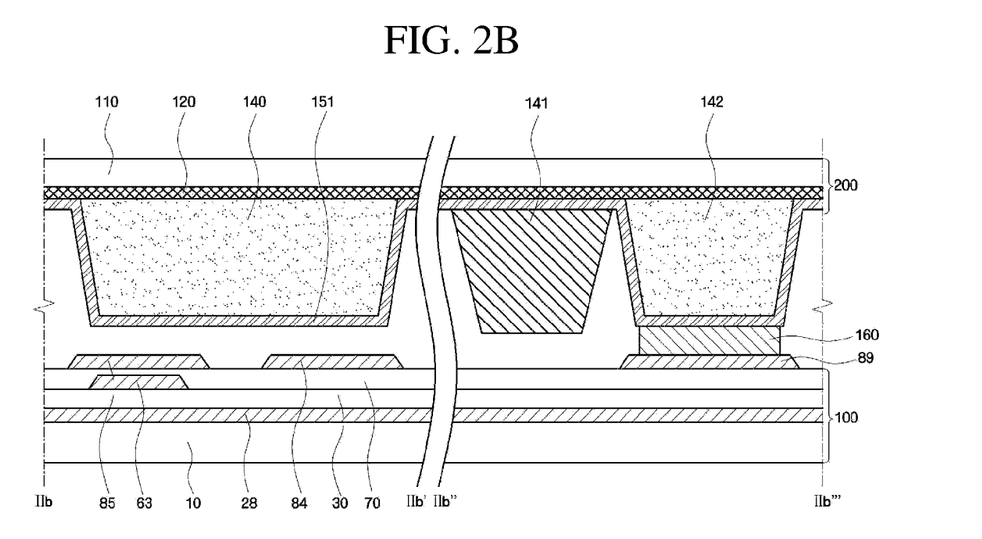
FIG. 2B is a partial cross-sectional view taken along lines IIb-IIb' and IIb"-IIb" of FIG. 1.
Figure 2C:
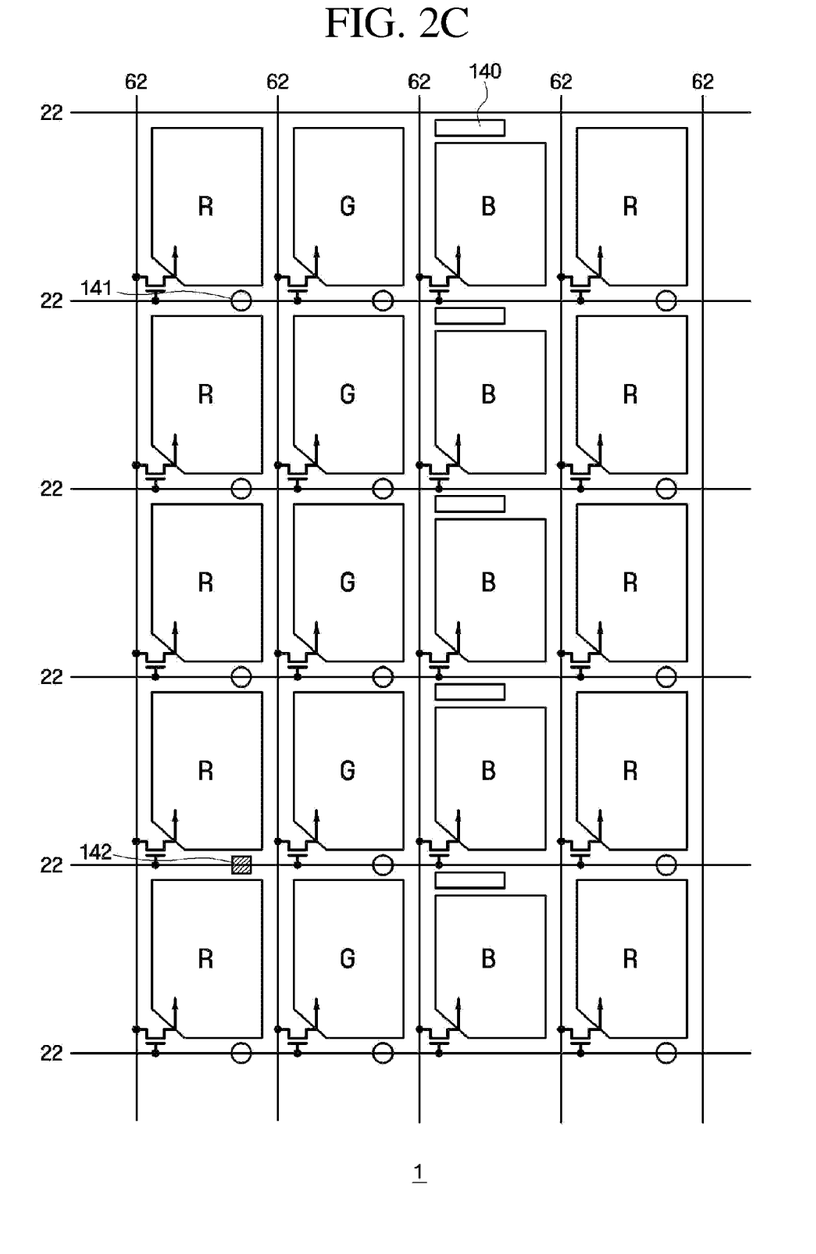
FIG. 2C is a schematic layout view for explaining how a sensor spacer, a supporting spacer and an auxiliary spacer are arranged in an LCD according to an exemplary embodiment of the present invention.

FIG. 1 is a layout view of an LCD according to an exemplary embodiment of the present invention, FIG. 2A is a partial cross-sectional view taken along line IIa-IIa' of FIG. 1, FIG. 2B is a partial cross-sectional view taken along lines IIb-IIb' and IIb"-IIb" of FIG. 1, and FIG. 2C is a schematic layout view of an arrangement of a plurality of sensor spacers, a plurality of supporting spacers and a plurality of auxiliary spacers in the LCD according to the exemplary embodiment of the present invention shown in FIG. 1.

An LCD 1 according to an exemplary embodiment of the present invention includes a lower display panel 100 which includes a thin-film transistor ("TFT"), an upper display panel 200 which faces the lower display panel 100 and includes a common electrode 150, and a liquid crystal layer 300 interposed between the lower display panel 100 and the upper display panel 200. In an exemplary embodiment, the TFT is defined by a gate line 22 and a data line 62.

The lower display panel 100 will hereinafter be described in further detail. In an exemplary embodiment, the gate line 22 and a gate electrode 26 are formed on a first substrate 10. The gate line 22 extends in a first direction, e.g., a substantially row, or horizontal, direction as viewed in FIG. 1. The gate electrode 26 extends from the gate line 22, e.g., the gate electrode 26 is a protrusion from the gate line 22. The gate line 22 and the gate electrode 26 will hereinafter be collectively referred to as "gate wiring".

A first sensor electrode line 28 and a first sensor electrode 29 are formed on the first substrate 10. The first sensor electrode line 28 extends in the first direction, e.g., substantially parallel to the gate line 22, as shown in FIG. 1. The first sensor electrode 29 extends from the first sensor electrode line 28, e.g., as a protrusion thereof, along a second direction substantially perpendicular to the first direction. In an exemplary embodiment of the present invention, the first sensor electrode 29 is a terminal of a touch screen sensor (not shown) and is connected to a first sensor pad 84 through a contact hole 72. When external pressure is applied, e.g., from a user touching the touch screen sensor, the first sensor electrode 29 is electrically connected to a sensor electrode 151, which is formed on a sensor spacer 140, and position information, indicating a point at which the external pressure is applied, is thereby provided by the sensor electrode 151. The first sensor electrode 29 and the first sensor electrode line 28 will hereinafter be collectively referred to as "first sensor wiring".

In an exemplary embodiment, the gate wiring and the first sensor wiring are formed of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), titanium (Ti) or tantalum (Ta), for example, but alternative exemplary embodiments are not limited thereto. Further, the gate wiring and the first sensor wiring may have a multilayer structure including two conductive layers (not shown) having different physical properties. More specifically, the gate wiring and the first sensor wiring in an exemplary embodiment may include a first conductive layer, formed of a metal having low resistivity, such as an aluminum-based metal, a silver-based metal or a copper-based metal, thereby reducing signal delays and voltage drops in the gate wiring and the first sensor wiring, and a second conductive layer formed of a material having excellent bonding properties with indium tin oxide ("ITO") and indium zinc oxide ("IZO"), such as a molybdenum-based material, chromium, titanium or tantalum. For example, the gate wiring and the first sensor wiring in an exemplary embodiment may include a chromium lower layer and an aluminum upper layer or, alternatively, an aluminum lower layer and a molybdenum upper layer. However, alternative exemplary embodiments of the present invention are not limited or restricted to the above-mentioned configurations. For example, the gate wiring and the first sensor wiring of alternative exemplary embodiments may include various materials and conductive materials other than those listed and/or described herein.

A gate insulation layer 30 is formed of silicon nitride ("SiNx"), for example, on the gate wiring and the first sensor wiring. A semiconductor layer 40 is formed of hydrogenated amorphous silicon ("a-Si") or polycrystalline silicon ("p-Si"), for example, on the gate insulation layer 30. In an exemplary embodiment, the semiconductor layer 40 is formed in various shapes, such as an island shape, e.g., a rectilinear shape, or a linear shape, for example. More specifically, the semiconductor layer 40 may be formed as an island on the gate electrode 26, as shown in FIG. 1. Alternatively, the semiconductor layer 40 may be formed below the data line 62 as a line which extends over the gate electrode 26 (not shown). When the semiconductor layer 40 is formed as a line, the semiconductor layer 40 may be formed by being patterned in substantially the same manner as for the data line 62.

Ohmic contact layers 55 and 56 are formed on the semiconductor layer 40 and may include silicide or n+ hydrogenated amorphous silicon doped with a high concentration of n-type impurities. The ohmic contact layers 55 and 56 may be formed in various shapes such as an island shape, e.g., a substantially rectilinear shape, or a linear shape. For example, the ohmic contact layers 55 and 56 may be formed as islands below a source electrode 65 and a drain electrode 66, respectively, as shown in FIG. 2A. When the ohmic contact layers 55 and 56 are formed as islands, the ohmic contact layers 55 and 56 may be disposed below the source electrode 55 and the drain electrode 66. Alternatively, when the ohmic contact layers 55 and 56 are formed as lines, the ohmic contact layers 55 and 56 may extend below the data line 62 (not shown).

The data line 62 and the drain electrode 66 are formed on the ohmic contact layers 55 and 56 and the gate insulating layer 30. The data line 62 extends in the second direction, e.g., a substantially column direction in FIG. 1, and intersects the gate line 22. The source electrode 65 is formed as a branch, e.g., a protrusion, of the data line 62 and extends over a portion of the semiconductor layer 40, as shown in FIG. 2A. Further, the drain electrode 66 is spaced apart from the source electrode 65. In addition, the drain electrode 66 and the source electrode 65 are disposed on substantially opposite sides of the gate electrode 26 and are formed on the semiconductor layer 40, as shown in FIG. 2A. The TFT, defined in an exemplary embodiment by the gate line 22 and the data line 62, is a three terminal device including the gate electrode 26, the source electrode 65 and the drain electrode 66. A current flows between the source electrode 65 and the drain electrode 66 when an appropriate voltage is applied to the gate electrode 26.

In an exemplary embodiment, the drain electrode 66 has a substantially bar-shaped pattern which extends over the semiconductor layer 40, and a drain electrode extension portion 67 which extends from the bar-shaped pattern as shown in FIGS. 1 and 2A. The drain electrode extension portion 67 has a wider area than an area of the bar-shaped pattern, and includes a contact hole 78 formed therein, as further shown in FIGS. 1 and 2A.

The data line 62, the source electrode 65, the drain electrode 66 and the drain electrode extension portion 67 will hereinafter be collectively referred to as "data wiring".

A second sensor electrode line 61 and a second sensor electrode 63 are formed on the gate insulation layer 30. The second sensor electrode line 61 is spaced apart from the data line 62 and extends in substantially the second direction. The second sensor electrode 63 extends from the second sensor electrode line 61, e.g., as a protrusion therefrom, and therefore has a width, as measured along the first direction, which is greater than a width of the second sensor electrode line 61 measured along the first direction. The second sensor electrode 63 according to an exemplary embodiment of the present invention is a terminal of a touch screen sensor (not shown) and is connected to a second sensor pad 85 through a contact hole 73. When external pressure is applied, e.g., by a user pressing the touch screen sensor, the second sensor electrode 63 is electrically connected to the sensor electrode 151 and thereby provides position information indicating a point at which the external pressure is applied. The second sensor electrode 63 and the second sensor electrode line 61 will hereinafter be collectively referred to as "second sensor wiring". In an exemplary embodiment, the first sensor wiring provides row-direction coordinate data of the position at which external pressure is applied, and the second sensor wiring provides column-direction coordinate data of the position at which external pressure is applied.

In an exemplary embodiment of the present invention, the data wiring and the second sensor wiring include a single layer structure or, alternatively, a multilayer structure including at least one of aluminum, chromium, molybdenum, tantalum and titanium, for example. Further, the data wiring and the second sensor wiring according to an exemplary embodiment may be formed of a fire-resistant metal such as a molybdenum-based metal, tantalum or titanium, but alternative exemplary embodiments are not limited thereto. The data wiring and the second sensor wiring may further include a lower layer formed of a fire-resistant metal, and an upper layer formed of a low-resistance material. For example, the data wiring and the second sensor wiring according to an exemplary embodiment include a double layer having a chromium lower layer and an aluminum upper layer or, in an alternative exemplary embodiment, an aluminum lower layer and a molybdenum upper layer. Yet another alternative exemplary embodiment of the present invention may include a triple layer having a molybdenum layer, an aluminum layer and a molybdenum layer.

The source electrode 65 overlaps at least a first portion the semiconductor layer 40, as shown in FIG. 2A. Further, the drain electrode 66 and the source electrode 65 are disposed on opposite sides of the gate electrode 26. The drain electrode 66 overlaps at least a second portion of the semiconductor layer 40. Further, the ohmic contact layer 55 is interposed between the source electrode 65 and the semiconductor layer 40, and the ohmic contact layer 56 is interposed between the drain electrode 66 and the semiconductor layer 40, as shown in FIG. 2A. Thus, the ohmic contact layers 55 and 56 reduce a contact resistance between the semiconductor layer 40 and the source electrode 65 and between the semiconductor layer 40 and the drain electrode 66, respectively.

A passivation layer 70 is formed of a dielectric material on the data wiring, the second sensor wiring, and an exposed portion of the semiconductor layer 40. in an exemplary embodiment, the passivation layer 70 is formed of an inorganic material such as silicon nitride or silicon oxide, an organic material having excellent planarization properties and photosensitivity, or a low-k dielectric material such as a-Si:C:O or a-Si:O:F formed by plasma enhanced chemical vapor deposition ("PECVD"), but alternative exemplary embodiments are not limited to the foregoing description. Further, when the passivation layer 70 is formed of an organic layer, the passivation layer 70 may be formed as a double layer having a lower inorganic layer formed of silicon nitride ("SiNx") or silicon oxide ("$SiO_2$") and an upper organic layer, in order to prevent the exposed portion of the semiconductor layer 40 from directly contacting the organic material. The passivation layer 70 may be formed of a thin inorganic material to improve a reliability of contact between the sensor spacer 140 and the first sensor pad 84, and between the sensor spacer 140 and the second sensor pad 85.

The contact hole 73 and the contact hole 78 are formed through the passivation layer 70. The contact holes 73 and 78 expose the second sensor electrode 63 and the drain electrode extension portion 67, respectively. In addition, the contact hole 72 is formed through the passivation layer 70 and the gate insulation layer 30 and thereby exposes the first sensor electrode 29, as shown in FIG. 1.

A pixel electrode 82 is formed on the passivation layer 70, conforming to the shape of a pixel. The pixel electrode 82 is electrically connected to the drain electrode 66 through the contact hole 78. The pixel electrode 82, together with the common electrode 150 of the upper display panel 200, generates an electric field therebetween, and thus aligns liquid crystal molecules in the liquid crystal layer 300, disposed between the pixel electrode 82 and the common electrode 150, to thereby display an image with the LCD 1 according to an exemplary embodiment of the present invention.

The first sensor pad 84 and the second sensor pad 85 are formed on the passivation layer 70. The first sensor pad 84 is connected to the first sensor electrode 29 through the contact hole 72, and the second sensor pad 85 is connected to the second sensor electrode 63 through the contact hole 73. In an exemplary embodiment, the pixel electrode 82, the first sensor pad 84 and the second sensor pad 85 are formed of a transparent conductive material such as ITO or IZO, or a reflective conductive material such as aluminum, but alternative exemplary embodiments are not limited thereto.

The first sensor pad 84 and the second sensor pad 85 are disposed on a level with each other and spaced apart from each other. The first sensor pad 84, the second sensor pad 85 and the sensor electrode 151 form a switching device. Specifically, the first sensor pad 84 and the second sensor pad 85, which are spaced apart from each other, are electrically connected to each other via the sensor electrode 151, and thus recognize the position of the sensor spacer 140. An operation of the LCD 1 will be described below in further detail. The first sensor pad 84 and the second sensor pad 85 according to an exemplary embodiment may be laid over a black matrix 120 of the upper display panel 200 (see FIGS. 2A and 2B).

A supporter 89, e.g., a supporting portion 89 may be disposed on the lower display panel 100. The supporting portion 89 supports a supporting spacer 142. The supporting portion 89 may be formed to the same height as the first sensor pad 84 and the second sensor pad 85. In addition, the supporting portion 89 may be formed of the same material as the first sensor pad 84 and the second sensor pad 85. The supporting portion 89 is optional, e.g., the supporting portion 89 may be omitted from alternative exemplary embodiment s of the present invention. In this case, the passivation layer 70 performs a function of the supporting portion 89.

In an exemplary embodiment, an alignment layer (not shown) which aligns the liquid crystal layer 300 is formed on the pixel electrode 82, the first sensor pad 84, the second sensor pad 85 and the passivation layer 70.

Still referring to FIGS. 1 through 2C, the upper display panel 200 will hereinafter be described in further detail. The black matrix 120 is formed on a second substrate 110, which is formed of a transparent dielectric material such as glass, for example, but not being limited thereto. In an exemplary embodiment, the black matrix 120 overlaps the gate line 22, the data line 62 and the TFT. The black matrix 120 may be formed of a metal such as chromium, a metal oxide such as chromium oxide, or organic black resist, for example, but alternative exemplary embodiments are not limited thereto.

In an exemplary embodiment, a color filter 130 such as a red, green or blue filter may be arranged in a pixel region substantially defined by the black matrix 120. An overcoat layer (not shown) may be formed on the color filter 130 to planarize the color filter 130.

The sensor spacer 140 is formed on the black matrix 120. The sensor spacer 140 may be formed of a photosensitive resin, for example. Further, the sensor spacer 140 may be formed with the color filter 130. The sensor spacer 140 protrudes downward, e.g., from the upper display panel 200 toward the lower display panel 100, as shown in FIG. 2B. In addition, the sensor spacer 140 overlaps at least a portion of each of the first sensor pad 84 and the second sensor pad 85. In an exemplary embodiment, the sensor spacer 140 is disposed at a predetermined distance from the first sensor pad 84 and the second senor pad 85, and is thus electrically isolated from the first sensor pad 84 and the second sensor pad 85. In an alternative exemplary embodiment of the present invention, the sensor spacer 140 may be substantially laid over the black matrix 120, instead of being laid over the pixel electrode 82, to prevent a reduction in an aperture ratio of each pixel of the LCD 1.

In an exemplary embodiment, the sensor spacer 140 is formed between adjacent blue color filters B, as shown in FIG. 2C.

The LCD 1 according to an exemplary embodiment of the present invention displays an image by mixing red light, green light and blue light emitted from red, green and blue color filters 130, respectively. An influence of blue light on a luminance of the LCD 1 is less than an influence of red light or green light on the luminance of the LCD 1. Thus, when the sensor spacer 140 is disposed over a portion of a blue color filter 230, the aperture ratio of the LCD 1 is not substantially reduced.

The sensor electrode 151 is formed on the sensor spacer 140, as shown in FIG. 2B. Further, the sensor electrode 151 may overlap at least a portion of both the first sensor pad 84 and the second sensor pad 85. Alternatively, the sensor electrode 151 may be disposed on an entire surface of the sensor spacer 140 (not shown). In an exemplary embodiment, the sensor electrode 151 is formed of substantially the same material as the common electrode 150. Specifically, the sensor electrode 151 may be formed as substantially one body including the common electrode 150. Alternatively, the sensor electrode 151 may be formed only on the sensor spacer 140. In this case, the sensor electrode 151 may electrically connect the first sensor pad 84 and the second sensor pad 85 by receiving a signal from one of the first sensor pad 84 and the second sensor pad 85 and outputting the received signal to the other sensor pad of the one of the first sensor pad 84 and the second sensor pad 85.

The upper display panel 200 according to an exemplary embodiment of the present invention further includes the supporting spacer 142, which is spaced apart from the sensor spacer 140, as shown in FIGS. 1 and 2B. The supporting spacer 142 maintains a cell gap between adjacent a liquid crystal panels of the LCD 1. Further, a supporting dielectric portion 160 is formed on the supporting spacer 142. In an exemplary embodiment, the supporting spacer 142 is formed to have a substantially same height as a height of the sensor spacer 140, relative to a surface of the upper display panel 200, by using a common method to form the sensor spacer 140 and the supporting spacer 142. As a result, a cell gap is uniformly maintained between the liquid crystal panels, and a reliability of the LCD 1 is thereby substantially improved in an exemplary embodiment of the present invention.

In addition, since the supporting spacer 142 is formed using the same method which is used to form the sensor spacer 140, the common electrode 150 extends over at least a portion of the supporting spacer 142. Thus, a distance between the supporting spacer 142 and the supporting portion 89 is maintained to be substantially the same as a distance between the sensor spacer 140 and each of the first sensor pad 84 and the second sensor pad 85.

The supporting dielectric portion 160 is interposed between the supporting spacer 142 and the supporting portion 89, as shown in FIG. 2B. The supporting dielectric portion 160 electrically isolates the supporting spacer 142 from the supporting portion 89, and, along with the supporting portion 89, uniformly adjusts a distance between the sensor electrode 151 and each of the first sensor pad 84 and the second sensor pad 85, thereby preventing the distance between the sensor spacer 140 and each of the first sensor pads 84 and the second sensor pad 85 from becoming irregular, e.g., uneven, due to drift, e.g., variations in a production process, or through use of the LCD 1 according to an exemplary embodiment, for example.

In an exemplary embodiment, the supporting spacer 142 is formed on the black matrix 120. A distance between adjacent supporting spacers 142 is determined based on a desired feel of a touch between the sensor spacer 140 and each of the first sensor pad 84 and the second sensor pad 85.

To maintain the uniform cell gap of the liquid crystal panel and to protect the sensor spacer 140 and/or each of the first sensor pad 84 and the second sensor pad 85 when an excessive pressure is applied to the upper display panel 200, for example, the upper display panel 200 according to an exemplary embodiment further includes an auxiliary spacer 141. The auxiliary spacer 141 is formed on the black matrix 120, is disposed a predetermined distance apart from the sensor spacer 140, and protrudes toward the lower display panel 100, e.g., downward as shown in FIG. 2B. In an exemplary embodiment, the auxiliary spacer 141 may be with the supporting dielectric portion 160. A distance between the auxiliary spacer 141 and the lower display panel 100 may be greater than the distance between the sensor spacer 140 and each of the first sensor pad 84 and the second sensor pad 85. As a result, when a standard, e.g., non-excessive, pressure is applied to the upper display panel 200, the sensor spacer 140 contacts the first sensor pad 84 and the second sensor pad 85, whereas the auxiliary spacer 141 does not contact the lower display panel 100. On the other hand, when pressure higher than the standard pressure, e.g., an excessive pressure, is applied to the upper display panel 200, the sensor spacer 140 contacts the first sensor pad 84 and the second sensor pad 85, while the auxiliary spacer 141 contacts the lower display panel 100, thus further supporting the upper display panel 200 and thereby effectively preventing deformation of the upper display panel 200 of the LCD 1 according to an exemplary embodiment of the present invention.

The common electrode 150 according to an exemplary embodiment is formed of a transparent conductive material such as ITO or IZO, for example, on the black matrix 120, the color filter 130 and the sensor spacer 140.

An alignment layer (not shown) which aligns the liquid crystal molecules of the liquid crystal layer may be formed on the common electrode 150 in an alternative exemplary embodiment of the present invention.

As described in further detail above, the sensor spacer 140 is separate from the lower display panel 100 at an initial state, i.e., when no external pressure is applied. On the other hand, when an external pressure is applied, the common electrode 150 on the sensor spacer 140 contacts the first sensor pad 84 and the second sensor pad 85 and is thus electrically connected to the first sensor pad 84 and the second sensor pad 85, thereby recognizing a point at which the external pressure is applied.

An arrangement of the sensor spacer 140, the supporting spacer 142 and the auxiliary spacer 141 will hereinafter be described in further detail with reference to FIG. 2C.

Referring to FIG. 2C, pixels of a plurality of pixels according to an exemplary embodiment of the present invention are defined by gate lines 22 of a plurality of the gate lines 22 and data lines 62 of a plurality of the data lines 62 which intersect the gate lines 22. Specifically, red pixels R, green pixels G and blue pixels B are alternately arranged, as shown in FIG. 2C. A set of three pixels, e.g., a set including a red pixel R, a green pixel G and a blue pixel B is a dot. Thus, in an exemplary embodiment, a dot is defined as a pixel region including a pixel R, a green pixel G and a blue pixel B.

To precisely recognize application of an external pressure, a sensor spacer 140 is provided for each dot. A density of sensor spacers 140 in the LCD 1 according to alternative exemplary embodiments of the present invention may be adjusted based on a size of a liquid crystal panel and/or a size of pixels, for example. As described above, the sensor spacer 140 is formed between a pair of adjacent B pixels in an exemplary embodiment. The density of sensor spacers 140 in the LCD 1 affects a precision of determination of a touch position, e.g., a position at which the external pressure is applied.

In an exemplary embodiment, a supporting spacer 142 may be provided each 250 dots.

The density of supporting spacers 142 in the LCD 1 also affects a feel of a touch when applying the external pressure thereto. Specifically, an increase in the density of supporting spacers 142 in the LCD 1 results in an adverse feel when applying the external pressure, e.g., when touching the LCD 1. Thus, in an exemplary embodiment, the supporting spacers 142 are provided each 250 dots or, alternatively, each 300 dots. In addition, a plurality of the supporting spacers 142 is uniformly distributed in the LCD 1 according to an exemplary embodiment of the present invention.

Further, as described in greater detail above, the auxiliary spacer 141 may be formed near the sensor spacer 140 to effectively prevent an excessive pressure from being applied to the sensor spacer 140. In an exemplary embodiment, two auxiliary spacers 141 may be provided for each dot. Specifically, in an exemplary embodiment wherein the sensor spacer 140 is provided in a blue pixel B a given dot, two auxiliary spacers 141 may be provided in the corresponding red pixel R and the green pixel G pixels of the given dot.

The sensor spacer 140, the supporting spacer 142 and the auxiliary spacer 141 may be disposed over at least a portion of the black matrix 120 between adjacent pixels. Positions of the sensor spacer 140, the supporting spacer 142 and the auxiliary spacer 141 may be altered, however, based on a desired feel of touch and/or a precision of determination of a touch point in the LCD 1 according to alternative exemplary embodiments of the present invention.

Figure 3A:
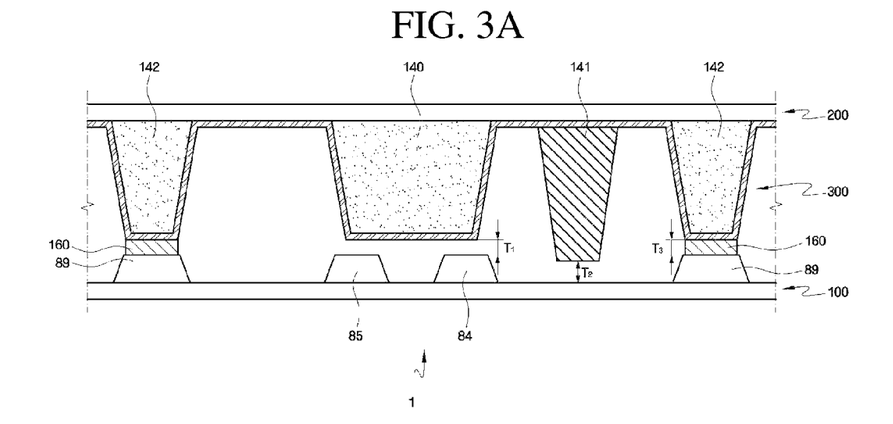
FIGS. 3A through 3C are partial cross-sectional views for explaining an operation of the LCD according to the exemplary embodiment of the present invention shown in FIG. 1.
Figure 3B:
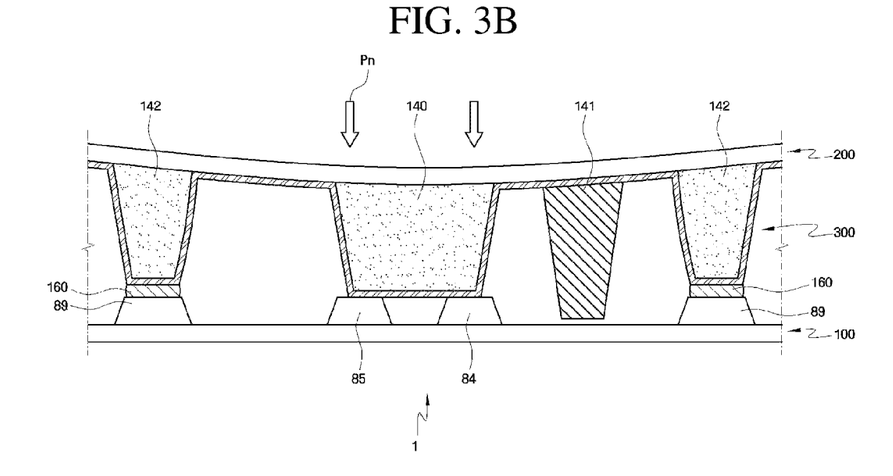
Figure 3C:
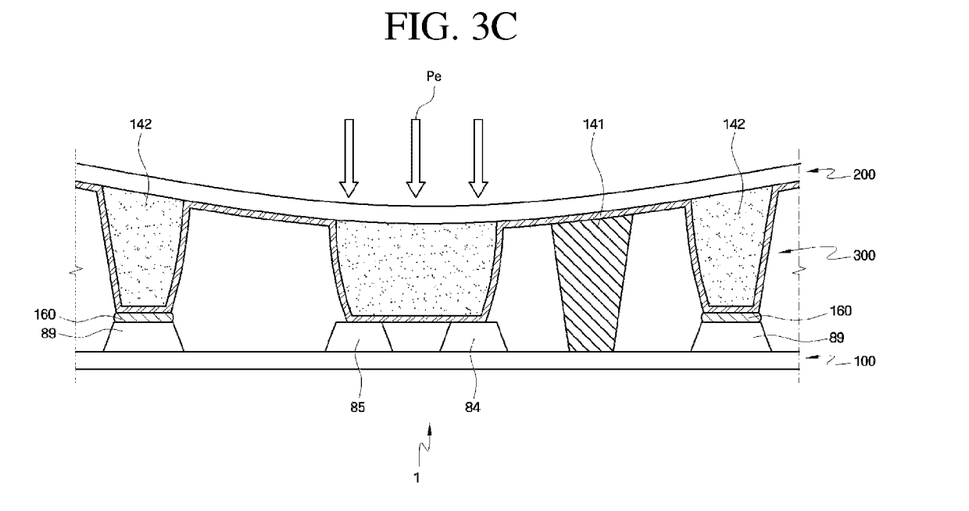

An operation of the LCD 1 according to the exemplary embodiment of the present invention shown in FIG. 1 will hereinafter be described in further detail with reference to FIGS. 3A through 3C. FIGS. 3A through 3C are partial cross-sectional views for explaining the operation of the LCD 1 according to the exemplary embodiment of the present invention shown in FIG. 1.

More specifically, FIG. 3A is a partial cross-sectional view which illustrates the LCD 1 in an initial state, e.g., when external pressure is not applied to the upper display panel 200. Referring to FIG. 3A, the lower display panel 100 and the upper display panel 200 are substantially parallel to each other, the sensor spacer 140 is a predetermined distance $T_1$ from the first sensor pad 84 and the second sensor pad 85, and the first sensor pad 84 and the second sensor pad 85 are electrically isolated from each other. The distance $T_1$ is substantially the same as a thickness $T_3$ of the supporting dielectric portion 160.

The auxiliary spacer 141 is a predetermined distance $T_2$ from the lower display panel 100. In an exemplary embodiment, the predetermined distance $T_2$ is greater than the predetermined distance $T_1$.

FIG. 3B is a partial cross-sectional view which illustrates the LCD 1 when a normal pressure Pn is applied to the upper display panel 200. Referring to FIG. 3B, when the normal pressure Pn is applied to the upper display panel 200, the upper display panel 200 bends downward, e.g., toward the lower display panel 100, and the sensor electrode 151 of the sensor spacer 140 thereby contacts the first sensor pad 84 and the second sensor pad 85. As a result, the first sensor pad 84 and the second sensor pad 85 are electrically connected, and a position of the sensor spacer 140 is thereby recognized.

In this case, the auxiliary spacer 141 does not contact the lower display panel 100, and thus, the distance between the auxiliary spacer 141 and the lower display panel 100 is uniformly maintained. Therefore, no external pressure is applied to the auxiliary spacer 141.

FIG. 3C is a partial cross-sectional view which illustrates the LCD 1 when excessive pressure Pe is applied to the upper display panel 200. Referring to FIG. 3C, when the excessive pressure Pe is applied to the supporting spacer 142 and the sensor spacer 140 when the sensor electrode 151 contacts the first sensor pad 84 and the second sensor pad 85, the sensor spacer 140, the sensor electrode 151, the first sensor pad 84 and the second sensor pad 85 may be damaged. In order to prevent this, the auxiliary spacer 141 is provided in the LCD 1 according to an exemplary embodiment of the present invention. The auxiliary spacer 141 supports the upper display panel 200 while the excessive pressure Pe is applied to the upper display panel 200. More specifically, when the excessive pressure Pe is applied, the auxiliary display panel 100 contacts the lower display panel 100, and thus effectively maintains the cell gap between the lower display panel 100 and the upper display panel 200. Therefore, the auxiliary spacer 141 disperses the external pressure Pe applied to the upper display panel 200 to supports the upper display panel 200, thereby effectively preventing damage to the LCD 1 according to an exemplary embodiment of the present invention.

A manufacturing method of the upper display panel 200 according to an exemplary embodiment of the present invention will hereinafter be described in further detail with reference to FIGS. 4A through 4E. FIGS. 4A through 4E are partial cross-sectional views for explaining a manufacturing method of the upper display panel 200 of the LCD 1 according to an exemplary embodiment of the present invention. The same labels in FIGS. 4A through 4E will be used to designate the same or like components as described above, and any repetitive detailed description thereof will hereinafter be omitted.

Figure 4A:
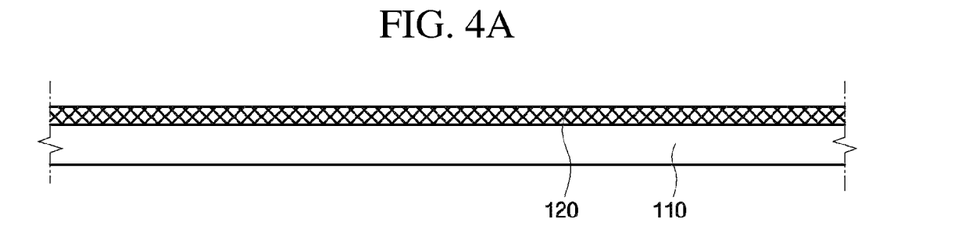

Referring to FIG. 4A, a light shield layer (not shown) for forming a black matrix 120 is formed on a first substrate 110. Thereafter, the black matrix 120 is formed by etching the light shield layer using a photoresist pattern (not shown) as an etching mask.

Figure 4B:
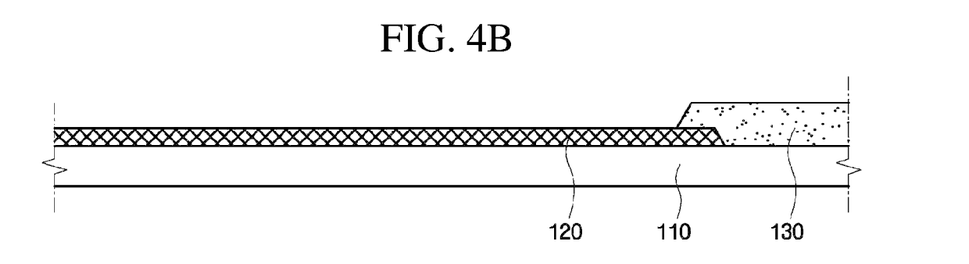

Thereafter, referring to FIG. 4B, a pixel region is defined by patterning the black matrix 120. Next, a color filter 130, such as a red color filter, a green color filter or a blue color filter, is formed in the pixel region.

Thereafter, referring to FIG. 4C, a photosensitive resin layer (not shown) is formed on substantially an entire exposed surface of the first substrate 110. Next, a sensor spacer 140 and a supporting spacer 142 are formed by performing an exposure and a development of the photosensitive resin layer and thereby patterning the photosensitive resin layer. To increase an aperture ratio of an LCD 1 according to an exemplary embodiment of the present invention, the sensor spacer 140 and the supporting spacer 142 are disposed on the black matrix 120. As described above in greater detail, a sensor spacer 140 may be provided for each dot, and two supporting spacers 142 may be provided for each dot.

Figure 4D:
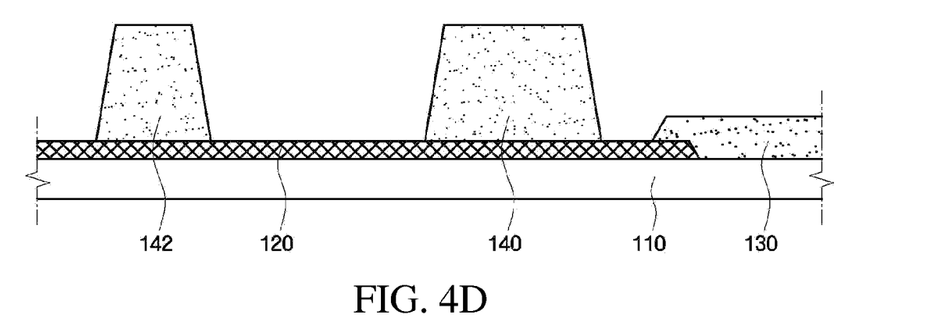

Referring now to FIG. 4D, a common electrode 150, having a uniform thickness thereof, is next formed. A portion of the common electrode 150 disposed on the sensor spacer 140 may become a sensor electrode 151.

Figure 4E:
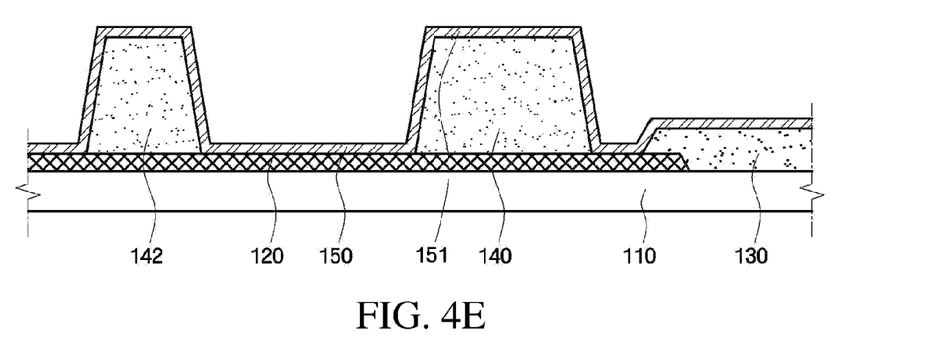

Next, referring to FIG. 4E, an organic layer (not shown) is formed on the common electrode 150. Thereafter, a supporting dielectric portion 160 and an auxiliary spacer 141 are formed by patterning the organic layer. The supporting dielectric portion 160 is formed on the supporting spacer 142, and the auxiliary spacer 141 is disposed over the black matrix 120. In an exemplary embodiment, two auxiliary spacers 141 may be provided for each dot. Further, the auxiliary spacer 141 may be formed in a pixel in which no sensor spacer 140 is formed. In an alternative exemplary embodiment, however, a position of the auxiliary spacer 141 may be altered. Further, the supporting dielectric portion 160 and the auxiliary spacer 141 may be formed together by using substantially the same method. A height of the auxiliary spacer 141 is adjusted by using a slit mask or a half mask, for example.

Thus, the upper display panel 200 is thereby manufactured according to an exemplary embodiment of the present invention. The upper display panel 200 is then disposed to substantially face a lower display panel 100 (FIGS. 2A through 2C), and a liquid crystal layer 300 is interposed between the upper display panel 200 and the lower display panel 100. Since the supporting spacer 142 and the supporting dielectric portion 160 support both the upper display panel 200 and the lower display panel 100, a cell gap between the upper display panel 200 and the lower display panel 100 are uniformly maintained in the LCD 1 according to an exemplary embodiment of the present invention. In an exemplary embodiment, the sensor spacer 140 and the auxiliary spacer 141 are both spaced apart from the lower display panel 100. Further, a distance between the auxiliary spacer 141 and the lower display panel 100 is greater than a distance between the sensor spacer 140 and the lower display panel 100 in the LCD 1 according to an exemplary embodiment of the present invention.

Figure 5:
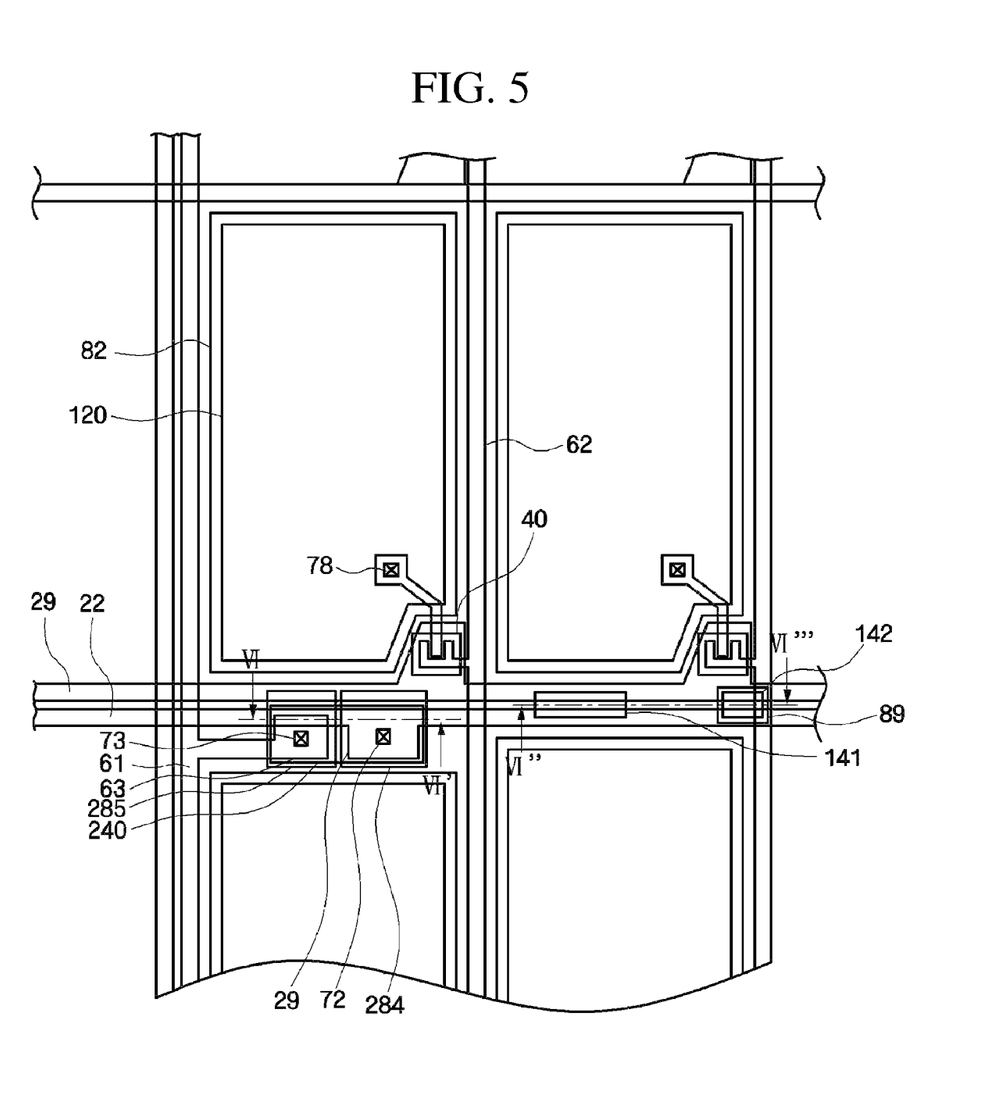
FIG. 5 is a layout view of an LCD according to an alternative exemplary embodiment of the present invention.
Figure 6:
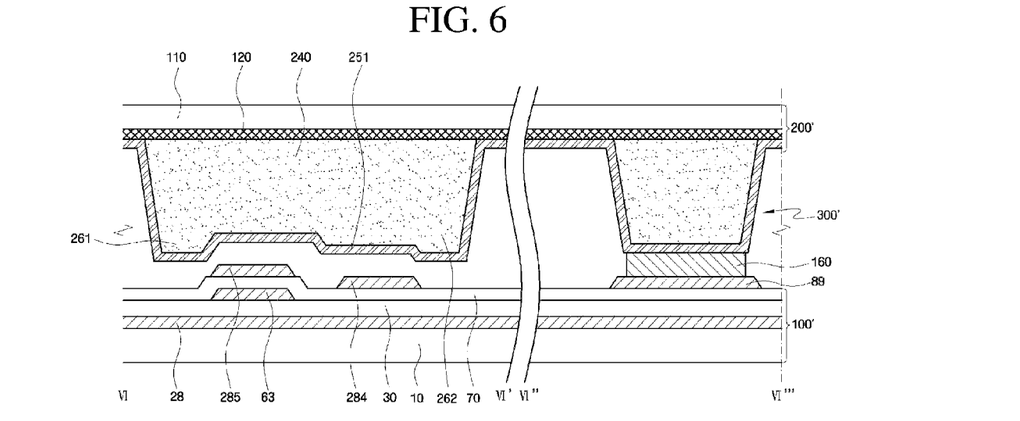
FIG. 6 is a partial cross-sectional view taken along lines VI-VI' and VI"-VI'" of FIG. 5.

An LCD according to an alternative exemplary embodiment of the present invention will hereinafter be described in further detail with reference to FIGS. 5 and 6. FIG. 5 is a layout view of an LCD 1' according to an alternative exemplary embodiment of the present invention, and FIG. 6 is a partial cross-sectional view taken along lines VI-VI' and VI"-VI''' of FIG. 5. In FIGS. 1 through 6, the same reference numerals indicate the same or like elements as described above, and any repetitive detailed description thereof will hereinafter be omitted.

Referring to FIGS. 5 and 6, a first supporting protrusions 261 and a second supporting protrusion 262 are formed on opposite sides of a sensor spacer 240.

As shown in FIG. 6, a bottom portion of the sensor spacer 240 has a step difference, e.g., a thickness of the sensor spacer 240 between an upper display panel 200' and a lower display panel 100' is not uniform. Specifically, a sensor electrode 251 is formed on a first portion of the bottom portion of the sensor spacer 240. In an exemplary embodiment, the sensor electrode 251 is part of a common electrode formed on an entire surface of the upper display panel 200'. Further, the sensor electrode 251 may be disposed to be in contact with a first sensor pad 284 and a second sensor pad 285 and may thus electrically connect the first sensor pad 284 and the second sensor pad 285. The first supporting protrusion 261 and the second supporting protrusion 262 protect the sensor spacer 240, the first pad 284 and the second sensor pad 285 when excessive pressure is applied to the sensor spacer 240.

In an exemplary embodiment, a predetermined distance $T_1'$ between the lower display panel 100' and the first supporting protrusion 261 and the second supporting protrusion 262 is greater than a distance between the sensor electrode 251 and each of the first sensor pad 284 and the second sensor pad 285. In an alternative exemplary embodiment, the first supporting protrusion 261 and the second supporting protrusion 262 are not formed on opposite sides of the sensor spacer 240. For example, the first supporting protrusion 261 and the second supporting protrusion 262 may be formed on one side, e.g., a same side, of the sensor spacer 240. The first supporting protrusion 261 and the second supporting protrusion 262 may also be formed of one body with the sensor spacer 240. Further, the first supporting protrusion 261 and the second supporting protrusion 262 may be formed on the sensor spacer 240 by using an inkjet firing method, for example, but alternative exemplary embodiments are not limited thereto.

Figure 7A:
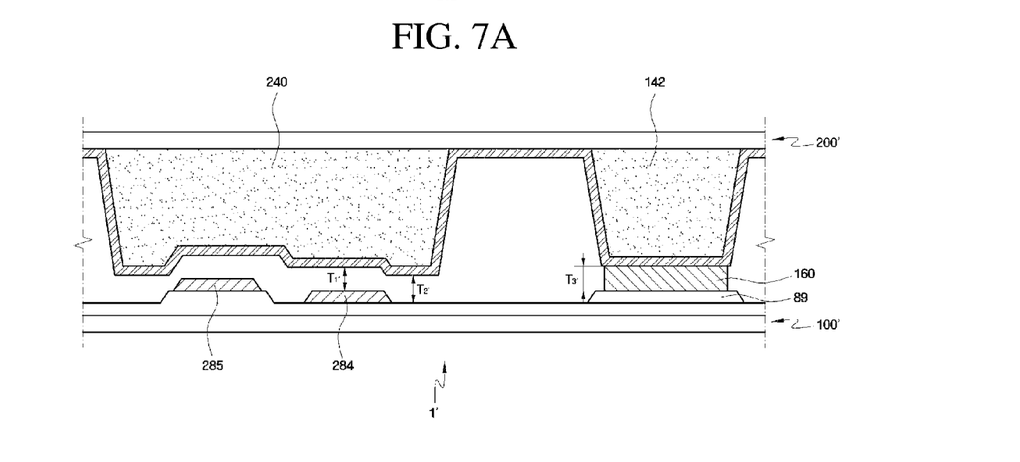
FIGS. 7A through 7C are partial cross-sectional views for explaining an operation of the LCD according to the exemplary embodiment of the present invention shown in FIG. 5.
Figure 7B:
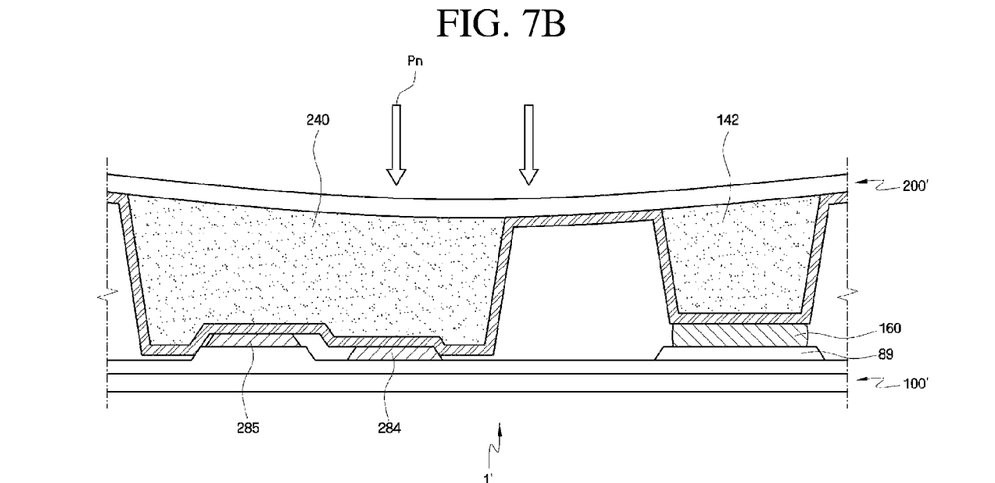
Figure 7C:
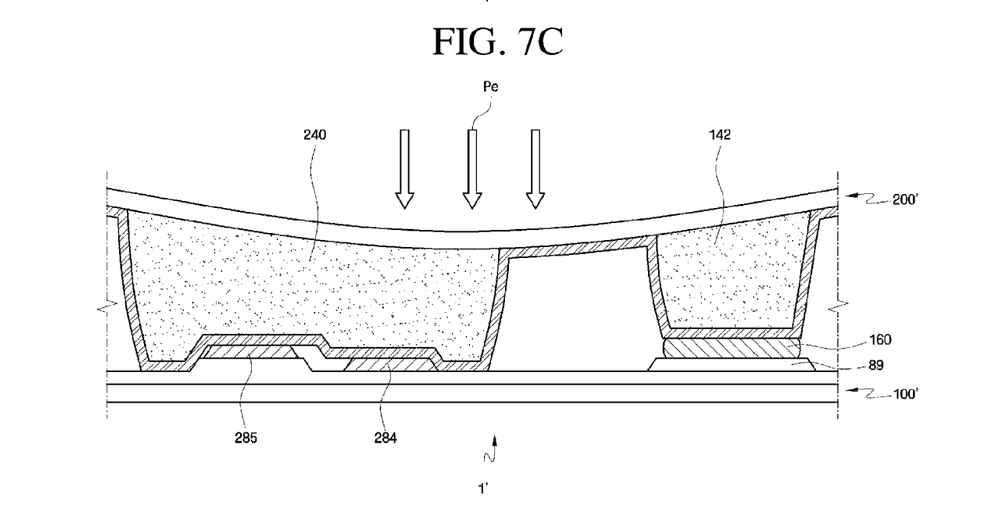

An operation of the LCD 1' according to an exemplary embodiment of the present invention will hereinafter be described in further detail with reference to FIGS. 7A through 7C. FIGS. 7A through 7C are partial cross-sectional views for explaining an operation of the LCD 1' according to an exemplary embodiment of the present invention.

FIG. 7A is a partial cross-sectional view showing the LCD 1' in an initial state, e.g., when external pressure is not applied to the upper display panel 200'. Referring to FIG. 7A, the lower display panel 100' and the upper display panel 200' are substantially parallel to each other, the sensor spacer 240 is a predetermined distance $T_1'$ from the first sensor pad 284 and the second sensor pad 285, and the first sensor pad 284 and the second sensor pad 285 are electrically isolated from each other. In an exemplary embodiment, the predetermined distance $T_1'$ is substantially the same as a thickness $T_3'$ of the supporting dielectric portion 160.

The first supporting protrusion 261 and the second supporting protrusion 262 are a predetermined distance $T_2'$ apart from the lower display panel 100'. In an exemplary embodiment, the predetermined distance $T_2'$ is greater than the predetermined distance $T_1'$ FIG. 7B is a partial cross-sectional view showing the LCD 1' when a normal pressure Pn is applied to the upper display panel 200'. Referring to FIG. 7B, when the normal pressure Pn is applied to the upper display panel 200', the upper display panel 200' bends downward, e.g., toward the lower display panel 100', and the sensor electrode 251 thereby contacts the first sensor pad 284 and the second sensor pad 285. Then, the first sensor pad 284 and the second sensor pad 285 are electrically connected, and a position of the sensor spacer 240 is thereby recognized.

In this case, the first supporting protrusion 261 and the second supporting protrusion 262 do not contact the lower display panel 100', and the a distance between the lower display panel 100' and the first supporting protrusion 261 and the second supporting protrusion 262 is thereby uniformly maintained. Therefore, no external pressure is applied to the first supporting protrusion 261 or the second supporting protrusion 262.

FIG. 7C is a partial cross-sectional view showing the LCD 1' when an excessive pressure Pe is applied to the upper display panel 200'. Referring to FIG. 7C, when the excessive pressure Pe is applied to the supporting spacer 142 and the sensor spacer 240 when the sensor electrode 251 already contacts the first sensor pad 84 and the second sensor pad 85, the sensor spacer 240, the sensor electrode 251, the first sensor pad 284 and the second sensor pad 285 may be damaged. In order to prevent this, the first supporting protrusion 261 and the second supporting protrusion 262 are provided in the LCD 1' according to an exemplary embodiment of the present invention. The first supporting protrusion 261 and the second supporting protrusion 262 support the upper display panel 200' while the excessive pressure Pe is applied to the upper display panel 200'. More specifically, when the excessive pressure Pe is applied, the first supporting protrusion 261 and the second supporting protrusion 262 contact the lower display panel 100', and thus maintain a cell gap between the lower display panel 100' and the upper display panel 200'. As a result, the first supporting protrusion 261 and the second supporting protrusion 262 disperse the excessive pressure Pe applied to the upper display panel 200', and support the upper display panel 200', thereby effectively preventing damage to the LCD 1' according to an exemplary embodiment of the present invention.

Figure 8:
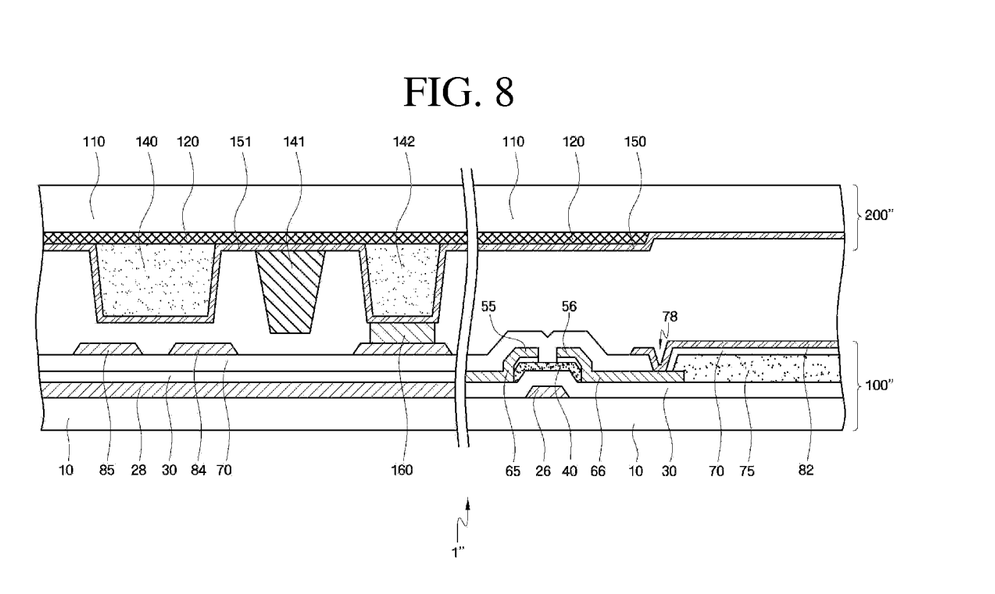
FIG. 8 is a partial cross-sectional view of an LCD according to yet another alternative embodiment of the present invention.

An LCD according to yet another alternative exemplary embodiment of the present invention will hereinafter be described in further detail with reference to FIG. 8. FIG. 8 is a partial cross-sectional view of an LCD 1" according to an alternative exemplary embodiment of the present invention. In FIGS. 1 through 4 and 8, the same reference numerals indicate the same or like elements, as described above, and any repetitive detailed description thereof will hereinafter be omitted.

Referring to FIG. 8, a color filter 75, such as a red, green or blue color filter 75, is formed in a pixel region on a first substrate 10. More specifically, a gate electrode 26, a gate insulation layer 30, a source electrode 65 and a drain electrode 66 are formed on the first substrate 10, and the color filter 75 is also formed on the first substrate 10.

A passivation layer 70 is formed on the color filter. A contact hole 78 is formed through the passivation layer 70 such that he drain electrode 66 is at least partially exposed through the passivation layer 70 via the contact hole 78.

A pixel electrode 82 is formed of a transparent conductive material such as ITO or IZO, for example, on the passivation layer 70. The pixel electrode 82 for each pixel is isolated, and is electrically connected to a respective drain electrode 66 through a corresponding contact hole 78.

The pixel electrode 82, together with the common electrode 150 of an upper display panel 200", generates an electric field therebetween, and thus aligns liquid crystal molecules in the liquid crystal layer 300, disposed between the pixel electrode 82 and the common electrode 150, to thereby display an image using the LCD 1" according to an exemplary embodiment of the present invention.

Thus, according to exemplary embodiments of the present invention as described herein, an LCD has at least the advantages of substantially increased operating reliability and durability.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display comprising:
   a first substrate;
   a sensor pad disposed on the first substrate;
   a second substrate which faces the first substrate;
   a sensor spacer disposed on the second substrate, wherein the sensor spacer is spaced apart from the sensor pad of the first substrate, and comprises a sensor electrode disposed on a portion of the sensor spacer which faces the sensor pad of the first substrate;
   a supporting spacer disposed on the second substrate and spaced apart from the first substrate;
   a supporting dielectric portion disposed between the supporting spacer and the first substrate, the supporting dielectric portion having a cross sectional area substantially similar to that of the supporting spacer in a plan view and which uniformly maintains a cell gap between the first substrate and the second substrate; and
   a liquid crystal layer which is interposed between the first substrate and the second substrate.

2. The liquid crystal display of claim 1, wherein the supporting spacer is spaced apart from the first substrate and a distance between the supporting spacer and the first substrate is approximately equal to a distance between the sensor spacer and the sensor pad.

3. The liquid crystal display of claim 2, further comprising a supporting portion disposed between the supporting dielectric portion and the first substrate, wherein a height of the supporting portion above the first substrate is approximately equal to a height of the sensor pad above the first substrate.

4. The liquid crystal display of claim 2, wherein the supporting spacer and the sensor spacer are simultaneously formed.

5. The liquid crystal display of claim 1, further comprising a black matrix disposed on the second substrate, wherein the supporting spacer is disposed over at least a portion of the black matrix.

6. The liquid crystal display of claim 1, wherein the supporting dielectric portion covers an upper portion of the supporting spacer.

7. The liquid crystal display of claim 1, further comprising a color filter disposed on the first substrate.

8. The liquid crystal display of claim 1, further comprising an auxiliary spacer disposed on the second substrate and spaced apart from the first substrate.

9. The liquid crystal display of claim 8, wherein a distance between the auxiliary spacer and the first substrate is greater than the distance between the sensor spacer and the sensor pad.

10. The liquid crystal display of claim 8, further comprising a black matrix disposed on the second substrate, wherein the auxiliary spacer overlaps at least a portion of the black matrix.

11. The liquid crystal display of claim 8, wherein the auxiliary spacer is formed in a first pixel adjacent to a second pixel, wherein the sensor spacer is formed in the second pixel.

12. The liquid crystal display of claim 1, further comprising a black matrix disposed on the second substrate, wherein the sensor spacer overlaps at least a portion of the black matrix.

13. The liquid crystal display of claim 12, further comprising a red color filter, a green color filter and a blue color filter disposed on one of the first substrate and the second substrate, wherein the sensor spacer is disposed between a pair of adjacent blue color filters.

14. The liquid crystal display of claim 13, wherein one of the sensor spacer and the supporting spacer is disposed on at least one of the red color filter, the green color filter and the blue color filter.

15. The liquid crystal display of claim 1, wherein distances of portions of a lower surface of the sensor spacer from the second substrate are not equal.

16. The liquid crystal display of claim 15, further comprising a supporting protrusion disposed on a side of the sensor spacer, wherein
   the supporting protrusion protrudes from the side of the sensor spacer toward the first substrate and is spaced apart from the first substrate, and
   a distance between the supporting protrusion and the first substrate is substantially equal to the distance between the sensor spacer and the sensor pad.

17. The liquid crystal display of claim 1, wherein the sensor pad comprises a first sensor pad and a second sensor pad which are spaced apart from the first sensor pad, wherein a sensor electrode on the sensor spacer is configured to electrically connect the first sensor pad and a second sensor pad.

18. The liquid crystal display of claim 17, wherein a height of the first sensor pad is not equal to a height of the second sensor pad.

19. The liquid crystal display of claim 1, wherein the sensor pad is formed of one of indium tin oxide and indium zinc oxide.

20. The liquid crystal display of claim 1, wherein the sensor electrode further comprises a common electrode.

21. A method of manufacturing a liquid crystal display, the method comprising:
   forming a black matrix on an insulating substrate;
   forming a sensor spacer on the black matrix;
   forming a supporting spacer on the black matrix;
   forming an electrode on the sensor spacer and the supporting spacer; and
   forming a supporting dielectric portion on the supporting spacer, the supporting dielectric portion having a cross sectional area substantially similar to that of the supporting spacer in a plan view.

22. The method of claim 21, wherein the forming the sensor spacer and the forming the supporting spacer are performed together.

23. The method of claim 22, further comprising:
forming an auxiliary spacer on the insulating substrate; and
aligning a display panel to face the insulating substrate,
  wherein a distance between the auxiliary spacer and the lower display panel is greater than a distance between the sensor spacer and the lower display panel.

24. The method of claim 23, wherein the forming the auxiliary spacer and the forming the supporting dielectric portion are performed together.

* * * * *